Figure 1:
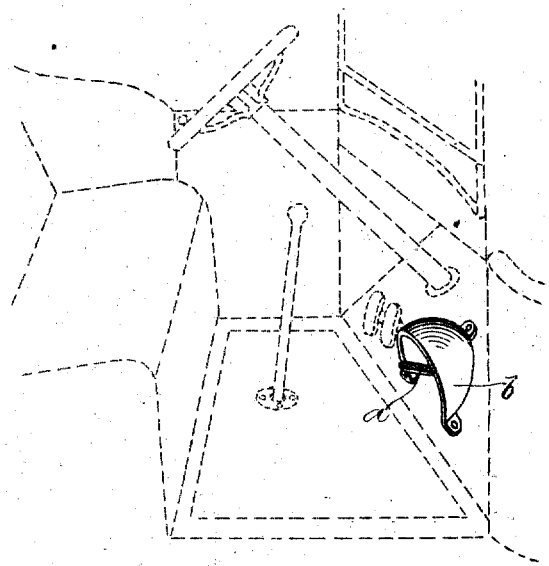

J. T. PARKER.
ACCELERATOR PROTECTOR FOR MOTOR VEHICLES, &c.
APPLICATION FILED JULY 9, 1917.

1,247,996.

Patented Nov. 27, 1917.

UNITED STATES PATENT OFFICE.

JOSEPH THOMPSON PARKER, OF WASHINGTON, DISTRICT OF COLUMBIA

ACCELERATOR-PROTECTOR FOR MOTOR-VEHICLES, &c.

1,247,996.  Specification of Letters Patent.  Patented Nov. 27, 1917.

Application filed July 9, 1917. Serial No. 179,445.

*To all whom it may concern:*

Be it known that I, JOSEPH THOMPSON PARKER, a citizen of the United States, and a resident of Washington, District of Columbia, have invented certain new and useful Improvements in Accelerator - Protectors for Motor - Vehicles, &c., of which the following is a full and clear specification.

This invention is applicable to that class of motor vehicles and motor boats which employ what is termed an accelerator, namely, a foot-operated device which insures an abnormal supply of fuel to the engine, to thereby quickly accelerate the speed of the vehicle, this foot-operated device usually being located alongside of the usual control pedals; and the object of my invention is to surround the accelerator pedal with a rigid hood so that there will be no liability of the accelerator pedal being operated by accident. It occasionally occurs that, in confusion or panic, the operator depresses the accelerator pedal instead of one of the regular pedals, thereby sending the car forward at a rapid speed when speed is not desired. This, as is obvious, may easily bring about a very dangerous situation. The object of my invention is to so protect the pedal that it can be operated only when the operation is carried out deliberately, as more fully hereinafter set forth.

In the drawing—

Figure 2:
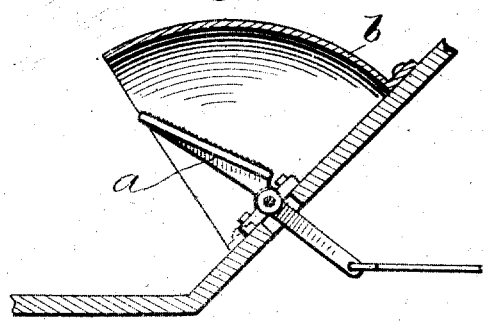

Figure 1 is a perspective view in dotted lines of sufficient parts of a motor vehicle to explain the application of my invention; and Fig. 2 is a vertical sectional view of my device.

Referring to the drawing by reference characters, $a$ designates the usual accelerator pedal which is mounted on the dash-board alongside the usual control pedals. Affixed to the dash-board is a hood $b$ which surrounds the pedal and extends forwardly to a point in front of the pedal, there being sufficient space between the pedal and the front edge of the hood to permit the foot or hand of the operator to depress the pedal to accelerate the vehicle. It will be observed that this hood surrounds the upper side of the pedal and hence the pedal cannot be operated in the manner that the other pedals are operated; that is, it requires that the toe of the foot be inserted under the hood before the pedal can be depressed. In this way, it is obvious, the operation of the accelerator is rendered fool-proof and all danger of the accelerator pedal being operated accidentally by a passenger of the car or by the operator in a panic is avoided.

The nature and scope of the invention having been thus indicated and its preferred embodiment having been specifically described, what is claimed as new is:

In a motor vehicle having an accelerator pedal located alongside the usual control pedals, a rigid hood extending forwardly over the said accelerator pedal, for the purpose set forth.

In testimony whereof I hereunto affix my signature.

JOSEPH THOMPSON PARKER.